(12) United States Patent
Neumüller

(10) Patent No.: US 10,434,739 B2
(45) Date of Patent: Oct. 8, 2019

(54) DEVICE FOR COOLING ADHESIVE APPLIED TO A SURFACE OF SACK BODIES

(71) Applicant: STARLINGER & CO GESELLSCHAFT M.B.H., Vienna (AT)

(72) Inventor: Norbert Neumüller, Weissenbach/Triesting (AT)

(73) Assignee: STARLINGER & CO GESELLSCHAFT M.B.H., Vienna (AT)

( * ) Notice: Subject to any disclaimer, the term of this patent is extended or adjusted under 35 U.S.C. 154(b) by 61 days.

(21) Appl. No.: 15/515,070

(22) PCT Filed: Sep. 24, 2015

(86) PCT No.: PCT/EP2015/071989
§ 371 (c)(1),
(2) Date: Mar. 28, 2017

(87) PCT Pub. No.: WO2016/050602
PCT Pub. Date: Apr. 7, 2016

(65) Prior Publication Data
US 2018/0229464 A1 Aug. 16, 2018

(30) Foreign Application Priority Data
Oct. 2, 2014 (EP) .................................... 14187508

(51) Int. Cl.
*B31B 70/62* (2017.01)
*B05C 1/00* (2006.01)
(Continued)

(52) U.S. Cl.
CPC ............ *B31B 70/626* (2017.08); *B05C 1/003* (2013.01); *B29C 66/8511* (2013.01);
(Continued)

(58) Field of Classification Search
CPC ................................. B05C 9/14; B05C 1/003
See application file for complete search history.

(56) References Cited

U.S. PATENT DOCUMENTS 2,032,503 A * 3/1936 Rosmait ................. B31B 70/00
226/172
4,008,850 A  2/1977 Goodrich
(Continued)

FOREIGN PATENT DOCUMENTS

DE  102009056078 A1  6/2011
DE  102009056078 B4  3/2012
(Continued)

OTHER PUBLICATIONS

International Preliminary Report on Patentability of PCT/EP2015/071989, dated Apr. 20, 2017, filed Sep. 24, 2015.
(Continued)

*Primary Examiner* — Karl Kurple
(74) *Attorney, Agent, or Firm* — Workman Nydegger

(57) ABSTRACT

The device for cooling an adhesive applied to a surface of bag bodies includes a transfer conveyor and a cooling conveyor. The transfer conveyor conveys the bag bodies at a transfer speed to the cooling conveyor, and the cooling conveyor conveys the bag bodies taken over from the transfer conveyor at a cooling conveyor speed. The transfer speed is higher than the cooling conveyor speed, which is why the bag bodies are arranged overlapping each other on the cooling conveyor. Due to this higher packing density, there is achieved a long dwell time of the bag bodies in the cooling conveyor at simultaneously a high flow-rate of bag bodies through the device.

11 Claims, 2 Drawing Sheets

Figure 1:
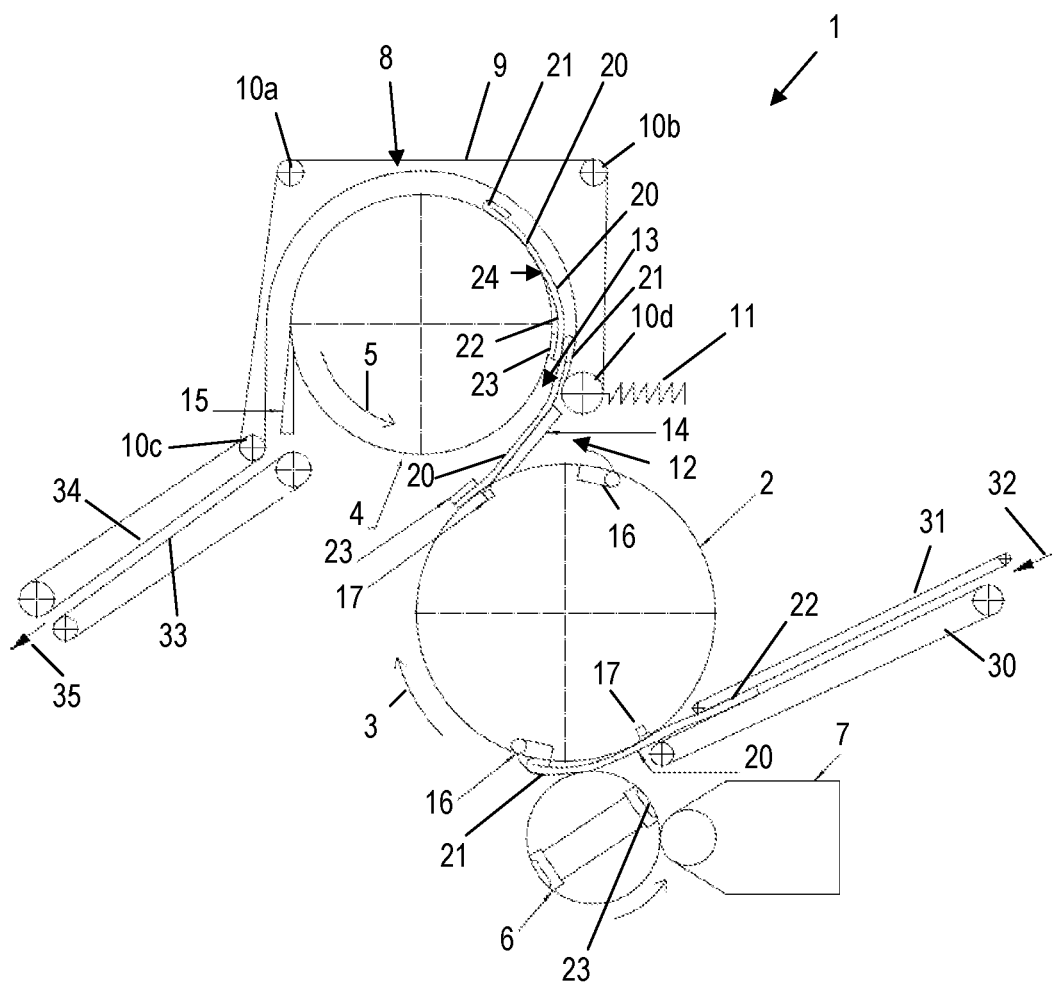

(51) Int. Cl.
  *B65H 29/66* (2006.01)
  *B29C 65/00* (2006.01)
  *B65H 29/06* (2006.01)
  *B65H 29/12* (2006.01)
  *B31B 70/02* (2017.01)
  *B31B 70/74* (2017.01)
  *B31B 155/00* (2017.01)

(52) U.S. Cl.
  CPC ............ *B31B 70/024* (2017.08); *B31B 70/76* (2017.08); *B65H 29/06* (2013.01); *B65H 29/12* (2013.01); *B65H 29/6618* (2013.01); *B31B 2155/0012* (2017.08); *B65H 2301/3123* (2013.01); *B65H 2301/4473* (2013.01); *B65H 2301/4474* (2013.01); *B65H 2301/44714* (2013.01); *B65H 2301/5144* (2013.01); *B65H 2301/51132* (2013.01); *B65H 2404/1361* (2013.01); *B65H 2404/694* (2013.01); *B65H 2701/191* (2013.01)

(56) References Cited

U.S. PATENT DOCUMENTS

| | | | | |
|---|---|---|---|---|
| 4,231,558 A * | 11/1980 | Aterianus | ............... | B65H 29/51 270/60 |
| 4,332,578 A * | 6/1982 | van der Meulen | ..... | B31B 70/00 156/267 |
| 4,396,449 A * | 8/1983 | Tumminia | .......... | B29C 65/7433 156/251 |
| 4,452,597 A * | 6/1984 | Achelpohl | ......... | B65H 29/6618 493/204 |
| 5,849,358 A | 12/1998 | Le Riche | | |
| 5,857,954 A * | 1/1999 | Achelpohl | .............. | B31B 70/00 493/245 |
| 2002/0114889 A1* | 8/2002 | VerMehren | ........ | A47G 25/1407 427/348 |
| 2004/0092375 A1* | 5/2004 | Pansier | ..................... | B65B 1/18 493/195 |
| 2009/0266032 A1* | 10/2009 | Spinks | ..................... | B68G 9/00 53/438 |
| 2013/0036710 A1* | 2/2013 | Knoke | ..................... | B65B 1/02 53/412 |
| 2013/0217556 A1* | 8/2013 | Mori | .................. | B65D 75/5822 493/186 |
| 2013/0324386 A1* | 12/2013 | Lin | .......................... | B31B 49/04 493/264 |

FOREIGN PATENT DOCUMENTS

| | | |
|---|---|---|
| WO | WO2011/084727 | 7/2011 |
| WO | WO2013/109567 | 7/2013 |

OTHER PUBLICATIONS

Written Opinion I of PCT/EP2015/071989, dated Oct. 27, 2015, filed Sep. 24, 2015.
Written Opinion II of PCT/EP2015/071989, dated Sep. 1, 2016, filed Sep. 24, 2015.
International Search Report of PCT/EP2015/071989, dated Oct. 27, 2015, filed Sep. 24, 2015.
International Preliminary Report on Patentability of PCT/EP2015/071989, dated Jan. 20, 2017, filed Sep. 24, 2015.

* cited by examiner

DEVICE FOR COOLING ADHESIVE APPLIED TO A SURFACE OF SACK BODIES

The present application is a U.S. National Stage of International Application No. PCT/EP2015/071989, filed on Sep. 24, 2015, designating the United States and claiming the priority of European Patent Application No. 14187508.8 filed with the European Patent Office on Oct. 2, 2014. All of the aforementioned applications are incorporated herein in their respective entireties by this reference.

The invention relates to a device for cooling an adhesive applied to a surface of bag bodies, including a transfer conveyor and a cooling conveyor, wherein the transfer conveyor conveys bag bodies at a transfer speed to the cooling conveyor and wherein the cooling conveyor conveys bag bodies taken over from the transfer conveyor at a cooling conveyor speed.

The market is more and more in demand of high-quality printable stable bags for the consumer field. Especially in demand are gusseted bags such as, e.g., pinch bottom bags, made from plastic material, in particular plastic fabric (composite), as this material has a very high tensile strength in comparison with bags made from paper.

In particular in the field of animal feed, exiting bulk material constitutes a problem not only in the form of contamination but also with vermin being attracted, which may lead to hygiene problems.

The production of gusseted packaging made from paper has been known for many decades. In practice, such a packaging is produced according to the following procedure:

A flat paper web is provided with straight or stepped perforation lines at intervals of the future section lengths.

The flat web is formed into a tube and glued together in the longitudinal direction.

Subsequently, the tube sections are then separated by tearing off along the perforation lines.

An end area of the torn-off tube section is formed into a bottom area and glued together.

The construction of a "pinch bottom packaging" is known, e.g., from the U.S. Pat. No. 4,008,850 A, wherein in this document there is also suggested the use of plastic-coated paper for the web material and gluing together the plastic coating surfaces.

As the demand for pinch bottom bags made from plastic material, in particular plastic fabric (composite), is steadily increasing, also the requirements regarding the production rate of manufacturing plants for these bags are increasing.

A method for the production of pinch bottom bags made from plastic is described in the DE 102009056078 B4. Herein, the manufacturing of the bags is realized at least in part in the transversal direction to the tube material, and the pinch bottom surface is formed by way of a heat joining method. The production rate and the preciseness of such manufacturing plants, however, are limited by a necessary corner deflection.

Especially high production rates are achieved by manufacturing plants, in which the material web or the material tube, respectively, and the bag sections are guided in the longitudinal direction during manufacturing. For example, the transfer conveyor and the cooling conveyor are configured to convey the bag bodies with the longitudinal axes of the bag bodies in the conveying direction of the transfer conveyor and the cooling conveyor.

In order to enable closing the bag in a quick and clean way in the later filling process, there is applied re-activatable adhesive (e.g., hot melt) onto the open upper pinch surface already during manufacturing of the bags.

In order to prevent the bags from sticking together, which are stapled and palletized after the production process, the applied adhesive has to be completely block-free, this is, not sticky anymore. For this reason, there is required cooling and time when using a hot melt adhesive.

The cooling and time, which is required until the adhesive applied onto the open upper pinch surface is block-free, represent a limiting factor of the production rate of manufacturing plants. If the adhesive is not completely block-free due to a faster production, then there may occur sticking together of the bags at the upper pinch surfaces in the course of the subsequent stapling or palletizing, respectively. This will lead to significant problems when filling the bags in automatized filling plants.

The cooling of hot melt adhesives may be realized by cooling drums, at the surface of which the bags are guided, or along any other cooling sections. Cooling drums have the advantage that the adhesive rests on the cooling drum and that thus the cooling energy may be transferred directly.

A possibility of increasing the productivity of the bag manufacturing plants would be to increase the rotation speed of cooling drums and to reduce the temperature of the coolant flowing through the cooling drum. In this way, the adhesive could be cooled also with a shorter circulation time of the cooling drum. Using a coolant having a lower temperature, however, would form condensate on the cooling drum. As the adhesive does not require only cooling but rather also time in order to reach a block-free state thereof, only a faster cooling may not guarantee a block-free state of the adhesive on the bag directly after the manufacturing.

Also increasing the circumference of the cooling drum may lead to an improved cooling performance of the cooling drum, wherein the adhesive would have more time to reach a block-free state thereof. The installation of a larger cooling drum, however, would have negative consequences on the space requirements of the manufacturing plant.

In the WO 2013/109567 A1 there is described an invention, which may lessen or prevent, respectively, sticking together of the produced pinch bottom bags when these are stapled or palletized. For this reason, the adhesive is applied onto the open upper surface of the pinch bag using a special nozzle, which has several exit openings for the adhesive, whereby the adhesive is applied in several strips, so that the surface of the applied adhesive is not uniform but rather has elevations and recesses. There is also described a variant wherein the adhesive is applied in the form of a "fiberized overspray". In overall, the adhesive surface, by way of which one bag in the staple is adjacent to the next bag, is reduced, thus also lowering the risk of the bags sticking together. In this document, however, there is not mentioned how to achieve a higher production rate of pinch bottom bags using a re-activatable adhesive on the open upper pinch surface and how to guarantee a block-free state directly following production.

It is, hence, a task of the invention to produce pinch bottom bags (e.g., made from plastic fabric composite) with re-activatable adhesive on the open upper pinch surface at a high production rate, wherein the bags are block-free already directly after manufacturing in order to not stick together when being stapled or palletized.

The invention solves this task by providing a device for cooling an adhesive applied to a surface of bag bodies, including a transfer conveyor and a cooling conveyor, wherein the transfer conveyor conveys bag bodies at a transfer speed to the cooling conveyor and wherein the cooling conveyor conveys bag bodies taken over from the transfer conveyor at a cooling conveyor speed. According to the invention, the transfer speed is higher than the cooling conveyor speed, which is why the bag bodies that are moved upstream from the cooling conveyor at the transfer speed in the bag manufacturing plant are pushed together, partly overlapping each other, being arranged in a so-called "imbricated" way, wherein the re-activatable (e.g., hot melt) adhesive, which has been applied to a surface of the bag bodies, rests against the cooling conveyor. Due to the lower cooling conveyor speed in combination with the partly overlapping arrangement of the bag bodies there is achieved a long dwell time of the bag bodies on the cooling conveyor, whereby the adhesive, also in the case of higher production rate, that is high transfer speed, will have enough time for cooling and the bag bodies at the exit of the cooling conveyor will be already block-free.

Further advantageous embodiments of the invention are explained in the sub-claims and the following description.

In order to achieve a clean adhesive application and to prevent that adhesive contaminates the bag manufacturing plant, it is favourable if there is provided an adhesive transfer unit, which applies the adhesive onto an exposed surface of bag bodies conveyed on the transfer conveyor. The adhesive transfer unit may receive the adhesive from an adhesive application unit.

In order for the adhesive to be sufficiently cooled, there is preferably provided that the cooling conveyor conveys the bag bodies with the adhesive resting against a cooled surface of the cooling conveyor. The cooling effect, that is the temperature transfer, may be further supported if there is provided a pressing device, which presses the bag bodies against the cooling conveyor, whereby the bag bodies are simultaneously secured against shifting and slipping. A space-saving but rather reliable pressing device has at least one endless belt opposite to the cooling conveyor, which moves synchronously with the cooling conveyor. In order to facilitate shifting successive bag bodies on top of each other, there may be formed a gap between the cooling conveyor and the pressing device in an inlet area, tapering preferably in the conveying direction. Shifting successive bag bodies on top of each other (that is, the "imbricated" arrangement) is further simplified if the pressing device is spring-mounted in the inlet area.

In order to guarantee that a successive bag body is not shifted between the preceding bag body and the cooling conveyor but rather across the preceding bag bodies, there may be arranged bag body guiding means, in particular at least one metal inlet guiding plate between the transfer conveyor and the cooling conveyor. In order to reliably realize the further transport or stapling of ready-made bag bodies at the exit of the cooling conveyor, there may be arranged at the exit at least one metal outlet guiding plate.

In order to prevent shifting or slipping of the bag bodies during the conveyance thereof on the transfer conveyor or the cooling conveyor, respectively, in a preferred embodiment of the invention the transfer conveyor and/or the cooling conveyor are provided with bag body holding means, wherein the bag body holding means are formed preferably as graspers and/or vacuum exhausters.

In a preferred embodiment of the inventive device that is continuously movable, space-saving and well-coolable by means of a coolant the cooling conveyor is embodied as a cooling drum, the shell surface of which forming the cooling surface.

Due to a coarse cooling surface of the cooling conveyor, the boundary surface between cooling surface and surface of the adhesive may be increased. By impregnating the coarse cooling surface into the adhesive, the surface of the adhesive will also increase, whereby there is achieved an increase of the cooling performance and there is enabled also cooling of thicker adhesive layers.

In a preferred embodiment of the inventive device that is continuously movable and space-saving the transfer conveyor is embodied as a transfer drum.

In the following the invention is described in further detail in regard to the FIGS. 1 and 2, which show an embodiment of the inventive cooling device at various operation times in a schematic side view.

In the manufacturing of pinch bottom bags there are formed side gussets at tube sections formed of longitudinally glued together flat webs or from tube fabric. Subsequently, there is formed a pinch bottom surface at one end of the tube sections, the so-called "factory end" 21, representing in the filled bag the bottom end and, hence, the bottom surface, by the tube end being folded over along a folding line about 180° and being connected/glued together with the tube wall. In a bag body 20 thus produced the subsequent application of a re-activatable adhesive 23 is realized on a bag body surface 24 near the open end of the bag body 20. This open end is called "customer end" 22 and remains open when delivering the bag bodies to a customer. The customer then fills the bag body with a product, usually bulk material, such as, e.g., animal feed, and then closes the bag after filling by re-activating the adhesive 23 and folding over the open end of the bag body 20 onto the adhesive 23. Subsequently, the filled pinch bottom bag may be delivered to the shops.

Figure 2:
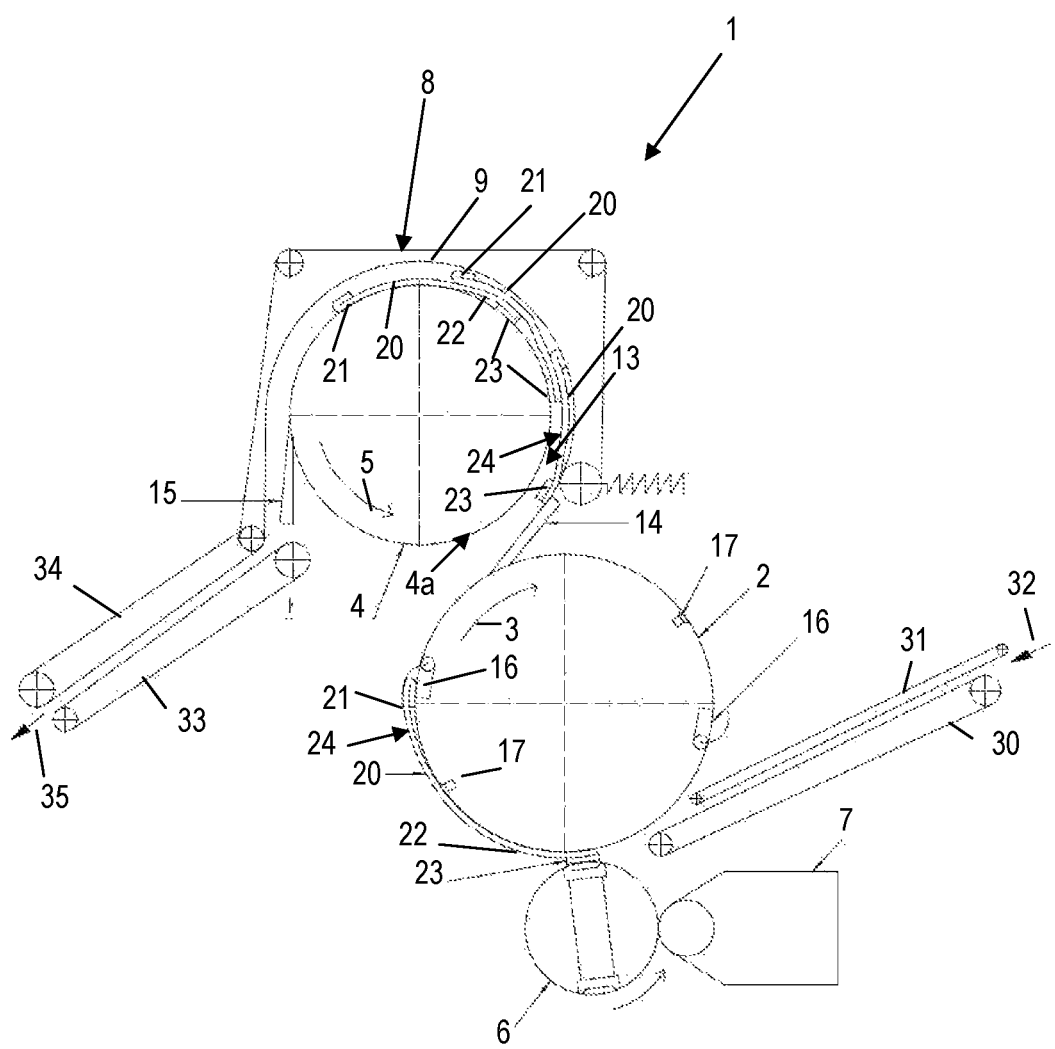

The device 1 illustrated in the FIGS. 1 and 2 represents a part of a bag manufacturing plant, wherein the bag bodies 20 already closed at their "factory end" 21 will move from upstream situated stations of the bag manufacturing plant along the arrow 32 to an inlet conveyor 30 and will be conveyed between the inlet conveyor and a pressing device 31 to a transfer conveyor 2 in the form of a transfer drum, will be taken over from the transfer conveyor 2 by means of graspers 16 and vacuum exhausters 17, will be held on the shell surface of the drum-like transfer conveyor and will be moved at a transfer speed (arrow 3). It is to be noted that also the inlet conveyor 30 has a conveying speed, which is the same as the transfer speed 3. As can be seen in the drawings, the "factory end" 21 is the leading end of the bag bodies 20 on the transfer conveyor 2 and the "customer end" 22 is the rear end.

On the way of the bag bodies 20 on the transfer conveyor 2 there is arranged a rotary cylinder-like adhesive transfer unit 6, which applies adhesive 23 near the "customer end" 22 onto an exposed surface 24 of the bag bodies 20 conveyed on the transfer conveyor 2. The adhesive transfer unit 6 receives the adhesive 23 from an adhesive application unit 7. Upon application of the adhesive 23 onto the bag body 20, this will be guided to a cooling conveyor 4 and transmitted in an inlet area 12 by means of metal guiding plates 14 into a gap 13 between the cooling conveyor 4 and a pressing device 8. The cooling conveyor 4 is embodied as a cooling drum and has a shell surface cooled by a coolant that is not illustrated, serving as a cooling surface 4a. As can be seen in the drawings, there is already conveyed a preceding bag body 20 in the gap between the cooling conveyor 4 and the pressing device 8 at a cooling conveying speed (arrow 5), wherein the surface 24 of the bag body 20, on which the adhesive 23 is situated, is facing the cooling surface 4a, which is embodied coarse in order to increase the boundary surface to the adhesive 23. The pressing device 8 has several endless belts 9 distributed across the width of the bag bodies 20 (in the side view of the FIGS. 1 and 2 there is only visible one endless belt 9), which press the bag bodies 20 against the cooling surface 4a. The endless belts 9 are deflected across several deflection pulleys 10a, 10b, 10c, 10d and move synchronously, that is also at a cooling conveying speed, with the cooling conveyor 4. Thereby, the deflection pulleys may be free pulleys, and the endless belts 9 may be entrained by the cooling surface 4a of the cooling conveyor 4 or by the bag bodies 20 or—as an alternative—at least one deflection pulley may be a driven pulley.

During the transfer of the bag bodies 20 from the transfer conveyor 2 to the cooling conveyor 4 by guiding using the metal guiding plates 14 the graspers 16 at the transfer conveyor 2 will be released and the vacuum exhausters 17 will be turned off. As the transfer speed 3 is higher than the cooling conveyor speed 5, during the transfer the leading end of the successive bag body 20 will be shifted across the rear end of the preceding bag body 20, which is why the two bag bodies will partly overlap. There is formed an "imbricated arrangement". In order to facilitate the overlapping process, the deflection pulley 10d in the inlet area 12 is movably supported by means of a spring 11.

Following the transfer of the bag bodies 20 to the cooling conveyor 4, the bag bodies 20 will be conveyed in an imbricated arrangement at the slower cooling conveyor speed 5 and will thus have a long dwell time with their adhesive 23 on the cooling surface 4a. As the packing density of the bag bodies 20 in the cooling conveyor 4 is essentially higher than in the preceding stations of the bag manufacturing plant, through which the bag bodies have been moved at the transfer speed, there is still achieved, however, a high flow-rate of bag bodies 20. At the exit of the cooling conveyor 4 there is arranged a metal outlet guiding plate 15, by means of which the cooled bag bodies 20 are guided between an exit conveyor 33 and a pressing device 34 and are then discharged in the direction 35 for stapling and subsequent palletizing.

The invention claimed is:

1. A device for cooling an adhesive applied to a surface of bag bodies, including a transfer conveyor and a cooling conveyor, wherein the transfer conveyor conveys the bag bodies at a transfer speed to the cooling conveyor and wherein the cooling conveyor conveys the bag bodies taken from the transfer conveyor at a cooling conveyor speed to an exit of the cooling conveyor, wherein the bag bodies receive the adhesive while being conveyed on the transfer conveyor; wherein the transfer speed is higher than the cooling conveyor speed, wherein the cooling conveyor has a cooling surface, which faces the surface of the bag bodies provided with the adhesive after the bag bodies have been conveyed from the transfer conveyor, wherein the cooling conveyor comprises a cooling drum having a shell surface which forms the cooling surface, the adhesive on the surface of the bag bodies is configured to have a dwell time on the cooling conveyor as the adhesive on the surface of the bag bodies is cooled on the cooling surface such that the adhesive on the surface of the bag bodies is no longer sticky at the exit of the cooling conveyor when the bag bodies leave the cooling conveyor, and wherein both the transfer conveyor and the cooling conveyor are configured to convey the bag bodies in a direction of the longitudinal axes of the bag bodies.

2. The device according to claim 1, further comprising an adhesive transfer unit, which applies the adhesive onto an exposed surface of bag bodies being conveyed on the transfer conveyor.

3. The device according to claim 2, further comprising an adhesive application unit, which applies the adhesive onto the adhesive transfer unit.

4. The device according to claim 1, further comprising a pressing device, which presses the bag bodies against the cooling conveyor.

5. The device according to claim 4, wherein the pressing device has at least one endless belt opposite to the cooling conveyor, which moves synchronously with the cooling conveyor.

6. The device according to claim 4, wherein there is formed a gap between the cooling conveyor and the pressing device in an inlet area, which is tapered in the conveying direction, wherein the pressing device is spring-mounted in the inlet area.

7. The device according to claim 1, wherein there are arranged between the transfer conveyor and at least one metal inlet guiding plate.

8. The device according to claim 1, wherein there is arranged at the exit of the cooling conveyor at least one metal outlet guiding plate.

9. The device according to claim 1, wherein the transfer conveyor and/or the cooling conveyor comprise graspers and/or vacuum exhausters.

10. The device according to claim 1, wherein the transfer conveyor comprises a transfer drum.

11. The device according to claim 2, wherein the adhesive transfer unit is a rotary cylinder.

* * * * *